United States Patent
Schaeffer et al.

(10) Patent No.: US 9,856,017 B2
(45) Date of Patent: Jan. 2, 2018

(54) TORQUE BASED METHOD OF LIMITING VERTICAL AXIS AUGMENTATION

(71) Applicant: Bell Helicopter Textron Inc., Fort Worth, TX (US)

(72) Inventors: Joseph M. Schaeffer, Cedar Hill, TX (US); Jignesh Patel, Trophy Club, TX (US); Eric O'Neill, Hurst, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 0 days.

(21) Appl. No.: 14/297,114

(22) Filed: Jun. 5, 2014

(65) Prior Publication Data

US 2014/0361118 A1 Dec. 11, 2014

Related U.S. Application Data

(60) Provisional application No. 61/833,481, filed on Jun. 11, 2013.

(51) Int. Cl.
| | | |
|---|---|---|
| *B64C 11/00* | (2006.01) | |
| *B64C 27/04* | (2006.01) | |
| *G05D 1/08* | (2006.01) | |

(52) U.S. Cl.
CPC ........... *B64C 27/04* (2013.01); *G05D 1/0858* (2013.01)

(58) Field of Classification Search
CPC ......... B64C 27/78; B64C 27/82; B64C 13/44; B64C 13/18; B64C 19/00; B64C 27/04; G05D 1/00; B64D 31/06
USPC ............ 244/8, 11, 17, 17.13, 181, 182, 195; 701/4, 6, 11, 5, 7, 8, 29.1
See application file for complete search history.

(56) References Cited

U.S. PATENT DOCUMENTS

| | | | | | |
|---|---|---|---|---|---|
| 4,387,432 | A | * | 6/1983 | Fischer | G05D 1/0833 244/17.13 |
| 4,628,455 | A | * | 12/1986 | Skutecki | G05D 1/0669 244/17.13 |
| 4,801,110 | A | * | 1/1989 | Skutecki | 244/17.13 |
| 4,834,318 | A | * | 5/1989 | Taylor et al. | 244/17.13 |
| 5,263,662 | A | * | 11/1993 | Fowler et al. | 244/17.13 |
| 5,951,608 | A | * | 9/1999 | Osder | 701/11 |
| 6,012,676 | A | | 1/2000 | Gold | |
| 6,691,950 | B2 | * | 2/2004 | Salesse-Lavergne | 244/17.13 |
| 7,512,464 | B2 | * | 3/2009 | Tarleton et al. | 701/3 |
| 7,756,612 | B2 | * | 7/2010 | Salesse-Lavergne | 701/4 |
| 8,694,182 | B2 | * | 4/2014 | Cherepinsky | 701/7 |
| 9,038,939 | B2 | * | 5/2015 | Dyrla et al. | 244/17.13 |
| 2003/0059303 | A1 | * | 3/2003 | Noussitou et al. | 416/44 |

(Continued)

FOREIGN PATENT DOCUMENTS

GB 2135794 A 9/1984

OTHER PUBLICATIONS

European Search Report in related European Application No. 14171607.6, dated Oct. 27, 2014, 3 pages.

(Continued)

*Primary Examiner* — Assres H Woldemaryam
(74) *Attorney, Agent, or Firm* — Lightfoot & Alford PLLC

(57) ABSTRACT

A method of limiting vertical axis augmentation in a rotorcraft, the method comprising: measuring a torque with a sensor; deriving a comparison of the torque to a lower torque limit, using a computer processor; and adjusting a vertical axis control command based upon the comparison of the torque to the lower torque limit.

16 Claims, 4 Drawing Sheets

(56) References Cited

U.S. PATENT DOCUMENTS

| | | | |
|---|---|---|---|
| 2003/0094539 A1* | 5/2003 | Schaeffer et al. | 244/17.13 |
| 2005/0004721 A1* | 1/2005 | Einthoven et al. | 701/4 |
| 2007/0262197 A1* | 11/2007 | Phelps et al. | 244/17.11 |
| 2008/0097658 A1* | 4/2008 | Shue et al. | 701/8 |
| 2008/0237393 A1* | 10/2008 | Challis | 244/17.21 |
| 2008/0283671 A1* | 11/2008 | Cherepinsky et al. | 244/195 |
| 2009/0266940 A1* | 10/2009 | Miller et al. | 244/223 |
| 2013/0054053 A1* | 2/2013 | Greenfield et al. | 701/3 |
| 2013/0325221 A1* | 12/2013 | Shue | 701/16 |
| 2013/0332022 A1* | 12/2013 | Green et al. | 701/29.1 |
| 2014/0252158 A1* | 9/2014 | Schaeffer | 244/17.13 |

OTHER PUBLICATIONS

Communication in related European Application No. 14171607.6, dated Nov. 13, 2014, 5 pages.

* cited by examiner

TORQUE BASED METHOD OF LIMITING VERTICAL AXIS AUGMENTATION

BACKGROUND

Technical Field

The present disclosure relates to a system and method of limiting vertical axis augmentation in a flight control system of a rotorcraft.

Description of Related Art

Conventionally, certain rotorcraft have employed some level of vertical axis control authority in a fly by wire flight control system. The vertical axis control authority is limited to prevent an unintentionally commanded rotor overspeed and declutching of the rotor system from the engine. One shortcoming of the very limited vertical axis control authority is that the vertical control laws can frequently reach an authority limit. When the vertical control laws reach the authority limit, they no longer provide benefit; however, a pure increase in the authority limit could result in the overspeed/declutch.

There is a need for an improved flight control system.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
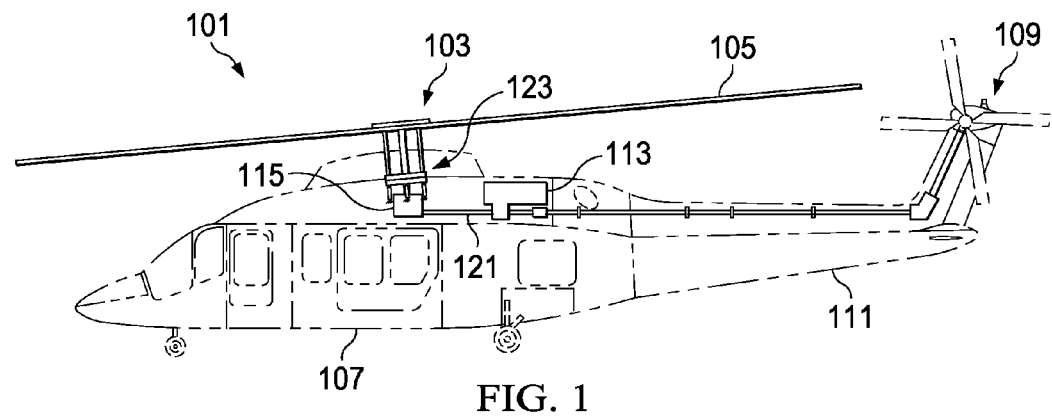
FIG. 1 is a side view of an rotorcraft, according to one example embodiment.

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various aspects of components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The method and system of the present disclosure relate to flight control systems on helicopters. In particular, the method and system of the present disclosure relate to vertical axis control system in a rotorcraft.

Certain rotorcraft can employ some level of vertical axis control authority in a fly by wire flight control system. The vertical axis control authority has conventionally been limited in order to prevent an unintentionally commanded rotor overspeed and declutching of the rotor system from the engine. One shortcoming of the very limited vertical axis control authority is that the vertical control laws can frequently reach an authority limit whereby the rotorcraft will experience degraded response due to non-linear effects, removal of feedback, and possible coupling with other axes. Furthermore, utilizing a very limited vertical control authority may not always prevent the undesired rotor overspeed and declutching of the rotor system from the engine. A rotor overspeed is the situation where the rotor system and associated drive shafts rotate faster than the engine, which can cause a declutching therebetween. One cause of a rotor overspeed condition is a reduction in collective pitch of the rotor blades, which causes the rotor system to accelerate.

During certain augmented maneuvers, the vertical control laws will adjust collective pitch in order to control altitude or rate of climb. Due to inflow changes, specifically during pitch-up/pull-up maneuvers, the control laws can reduce collective pitch low enough such that there would be no load on the rotors, resulting in declutching, and potential overspeed. The system and method of the present disclosure solve this problem by utilizing engine torque to define the lower limit of the collective augmentation system. When torque is below a certain value, the control laws can no longer reduce collective. This prevents the vertical augmentation from reducing pitch low enough to cause a declutch/needle split.

Therefore, one unique aspect of the method and system of the present disclosure is that engine torque is utilized to allow a high authority limit on the vertical axis control laws. As such, the concept of an altitude or vertical speed command is blended with a torque command, which represents an increase in engine/flight control system integration.

One flight scenario of which an overspeeding can occur is when rotorcraft is flying at a forward velocity but the pilot desires to the slow the forward velocity, so the pilot pulls back on the longitudinal cyclic. This action has the inherent reaction of the rotorcraft climbing in altitude; however, since the vertical flight control laws are configured to hold the rotorcraft at the commanded altitude, the control system may decrease collective pitch to prevent the rotorcraft from climbing in altitude. The decrease in collective pitch causes the rotor system to speed up. A continuation of the decrease in collective pitch to prevent the inadvertent altitude increase due to the continual pull back in longitudinal cyclic can eventually cause the rotor to overspeed and declutch from the engine, which is an undesirable affect. The system and method of the present disclosure function to prevent the rotor overspeed and declutching in the above scenario as well as other scenarios where rotor overspeed and declutching might inadvertently occur.

One benefit of the embodiments of the present disclosure is prevention of the vertical control laws from inadvertently commanding an undesired rotor overspeed condition. Furthermore, the embodiments of the present disclosure not only prevent an inadvertent command of undesired rotor overspeed condition, but also allow for the implementation of a high degree of augmentation in the vertical axis in the flight control system. The system and the method of prevent the rotor overspeed and possible declutching by analyzing engine torque and if engine torque decreases beyond a torque limit, then the system will prevent collective from being decreased further. This will cause the rotorcraft to climb in altitude (vertical axis), but this result is more desirable than rotor overspeeding and possible declutching. As long as the engine remains clutched, the engine control system will have the ability to control rotor speed. It should be appreciated that the pilot can override the system by making an overpowered command to the collective stick.

Referring now to FIG. 1 in the drawings, a rotorcraft 101 is illustrated. Rotorcraft 101 can include a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. It should be appreciated that swashplate mechanism 123 is merely exemplary of one possible system for selectively controlling the pitch of rotor blades 105; for example, an independent blade control system is another exemplary system for selectively controlling the pitch of rotor blades 105. Rotorcraft 101 can include an airframe 107, anti-torque system 109, and an empennage 111. Torque can be supplied to rotor system 103 and anti-torque system 109 with at least one engine 113. A main rotor gearbox 115 is operably associated with an engine main output driveshaft 121 and the main rotor mast.

Rotorcraft 101 is merely illustrative of the wide variety of aircraft and vehicles that are particularly well suited to take advantage of the method and system of the present disclosure. It should be appreciated that other aircraft can also utilize the method and system of the present disclosure.

Figure 2:
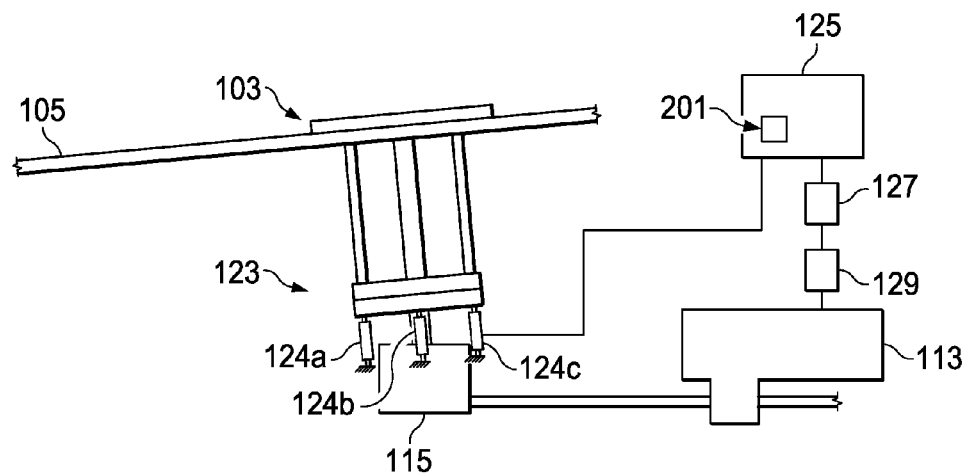
FIG. 2 is a partially schematic view of rotorcraft systems, according to one example embodiment.

Referring now also to FIG. 2 in the drawings, a system 201 is illustrated in conjunction with rotorcraft 101. It should be appreciated that though system 201 is illustrated with regard to rotorcraft 101, system 201 is also implementable on other aircraft as well. Further, it should be appreciated that system 201 can be implemented in a wide variety of configurations, depending in part on the flight control configuration of the aircraft.

System 201 is particularly well suited for implementation in aircraft having a fly-by-wire flight control computer, such as flight control computer 125; however, a partial fly-by-wire aircraft can also utilize system 201. For example, system 201 can be utilized with a flight control system having collective actuators 124a, 124b, and 124c that can receive commands from a trim motor, autopilot system, or any other system that allows collective commands to be realized by collective actuators 124a, 124b, and 124c. Further, system 201 is particularly well suited for implementation with aircraft having an engine controlled by an engine control unit 127, such as a FADEC (full authority digital engine control) system. However, system 201 can also be implemented on an aircraft having an engine that is not controlled by an engine control unit 127, in such an embodiment, system 201 can make fuel control commands directly to a fuel control unit 129, for example.

Figure 3:
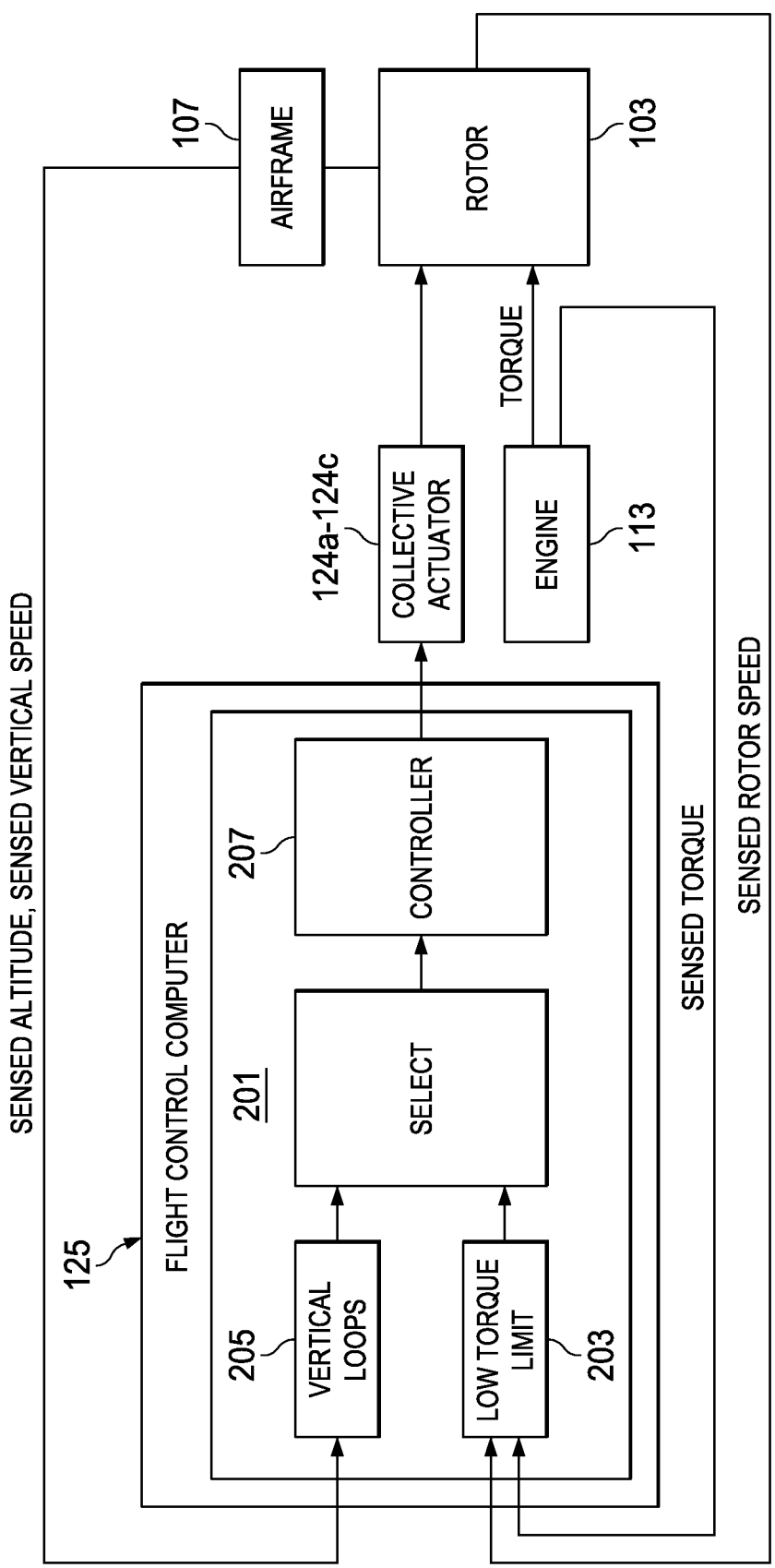
FIG. 3 is a schematic view of a system, according to one example embodiment.

Referring now also to FIG. 3, a schematic view of system 201 is schematically illustrated in conjunction with features of rotorcraft 101. System 201 is configured as an interface between engine 113, airframe 107, flight control computer 125, and collective actuators 124a-124c. The flight control computer 125 uses data from the engine 113 and rotor system 103 to calculate a collective pitch command. Any number and variety of sensors can be utilized to provide certain data to flight control computer 125 and system 201. System 201 is preferably integrated with flight control computer 125; however, in another embodiment system 201 can be a standalone computer system within the aircraft. As discussed further herein, flight control computer 125 and system 201 can include computer related equipment, such as processors and the like for performing associated functions.

Still referring to FIG. 3, system 201 can include control laws, which are illustrated as vertical loops 205. Vertical loops 205 can include vertical axis control laws configured to make control commands so that the rotorcraft can hold a desired vertical axis state, such as vertical speed or vertical altitude, for example. For example, the vertical loops 205 can adjust for differences between a commanded vertical state and an actual vertical state. One example can be if the rotorcraft is directed to hold the rotorcraft a commanded altitude, but the rotorcraft experiences a sudden downward gust of wind, then the vertical loops 205 will generate commands to collective actuators 124a-124c in order to increase pitch and thrust in order to maintain the commanded altitude.

System 201 can also include a controller 207 configured to adjust a received command to minimize an error signal and then send output adjusted command to collective actuators 124a-124c. In one embodiment, controller 207 includes proportional plus integral (P+I) functionality; however, it should be appreciated that controller 207 may include any implementation specific desired functionality.

One unique feature of system 201 is the inclusion of a low torque limit 203 in the process. Moreover, low torque limit 203 can be calculated and factored into the command outputs from vertical loops 205 to prevent the rotor overspeed and possible declutching by analyzing engine torque. In one embodiment, system 201 is configured such that if the measured torque, such as the engine torque, is below a predetermined lower torque limit, then the command by vertical loops 205 that would decrease torque would be negated. For example, if the measured torque were below a lower torque limit, then a command by vertical loops 205 to reduce collective in order to stay at a certain altitude would be disregarded so as to prevent the rotor overspeed and possible declutching that could otherwise result. This will cause the rotorcraft to climb in altitude (vertical axis), but this result is more desirable than rotor overspeeding and possible declutching.

Measured torque can be acquired by any variety of sensors configured to measured torque. In one embodiment, the measured torque is provided by a sensor in engine 113. In another embodiment, measured torque is torque measured in a drive train component between engine and rotor system 103. In another embodiment, measured torque is analytically derived from a variety of measurements by sensors.

Figure 4:
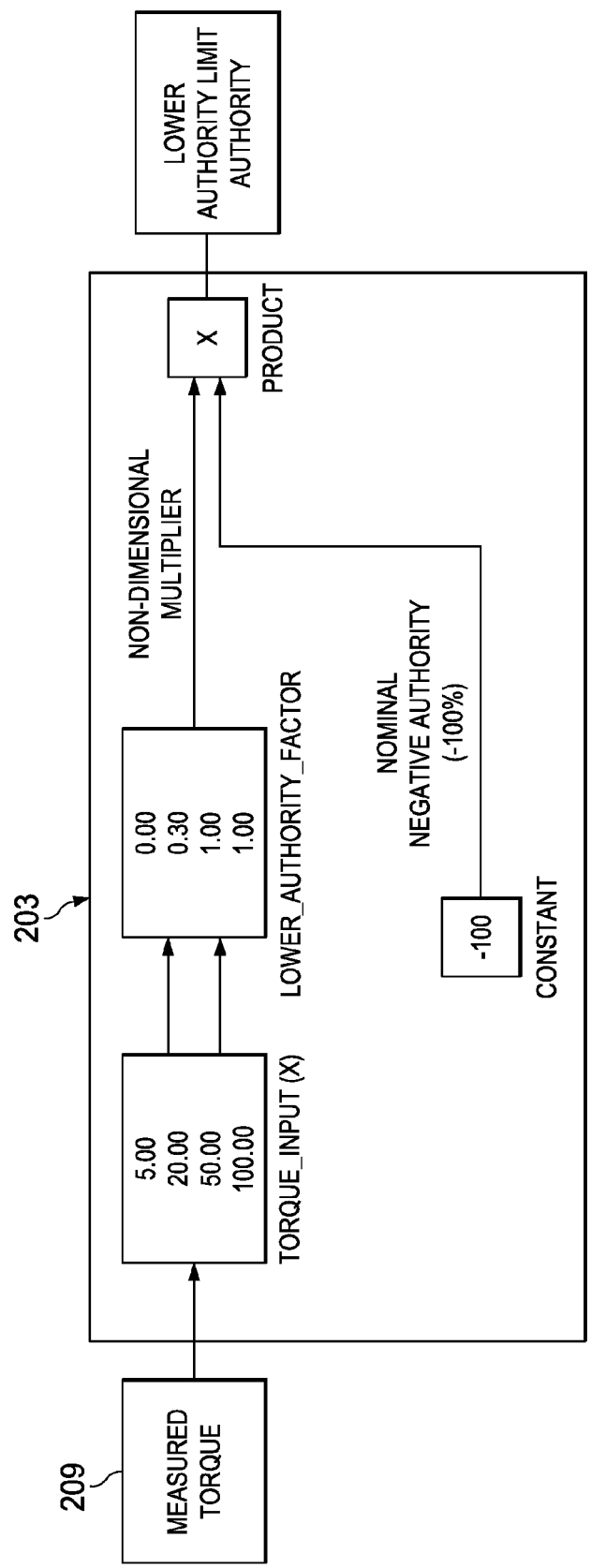
FIG. 4 is a schematic view of a torque comparison, according to one example embodiment.

Referring also to FIG. 4, another embodiment is schematically illustrated. The amount of lower vertical axis control authority of vertical loops 205 is reduced by a factor in accordance with the amount of measured torque. FIG. 4 illustrates an exemplary calculation of the lower vertical control limit authority. The lower limit is a function of measured engine torque. The values used in FIG. 4 are for illustration purposes only; actual design values may differ. At high torque, the vertical control laws are given high authority to reduce collective pitch. At low torque, the function prevents the vertical augmentation from reducing collective. In the example shown, if a measured torque 209 is 20% of the nominal torque, then the vertical axis lower authority can be adjusted to 30% of commanded, so that a command by vertical loops 205 to reduce collective will only reduce collective by 30% of commanded. When measured torque 209 is 50% of the nominal torque, the vertical axis lower authority remains at full authority. When measured torque 209 is at 5% nominal, the vertical axis lower authority is 0% of commanded. In other words, when torque is at 5%, the vertical augmentation can no longer reduce collective pitch to maintain altitude or vertical rate. The pilot can still enter autorotation if desired by lowering the collective stick to minimum position.

Figure 5:
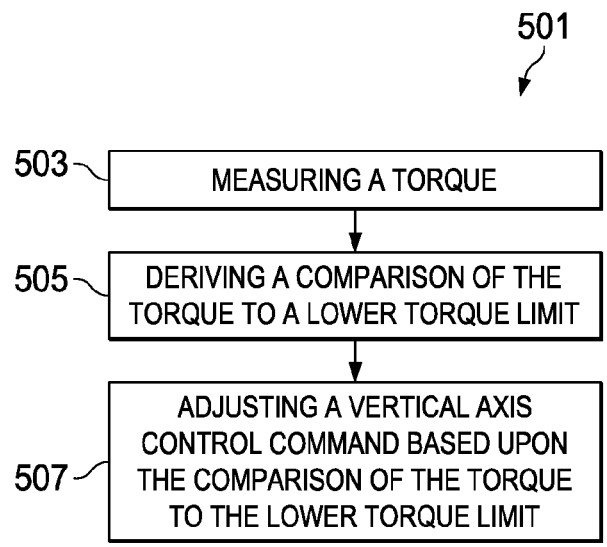
FIG. 5 is a schematic view of a method, according to one example embodiment.

Referring now also to FIG. 5, a method 501 of limiting vertical axis augmentation in a rotorcraft, the method comprising: a step 503 of measuring a torque with a sensor; a step 505 of deriving a comparison of the torque to a lower torque limit, using a computer processor; and a step 507 of adjusting a vertical axis control command based upon the comparison of the torque to the lower torque limit.

Figure 6:
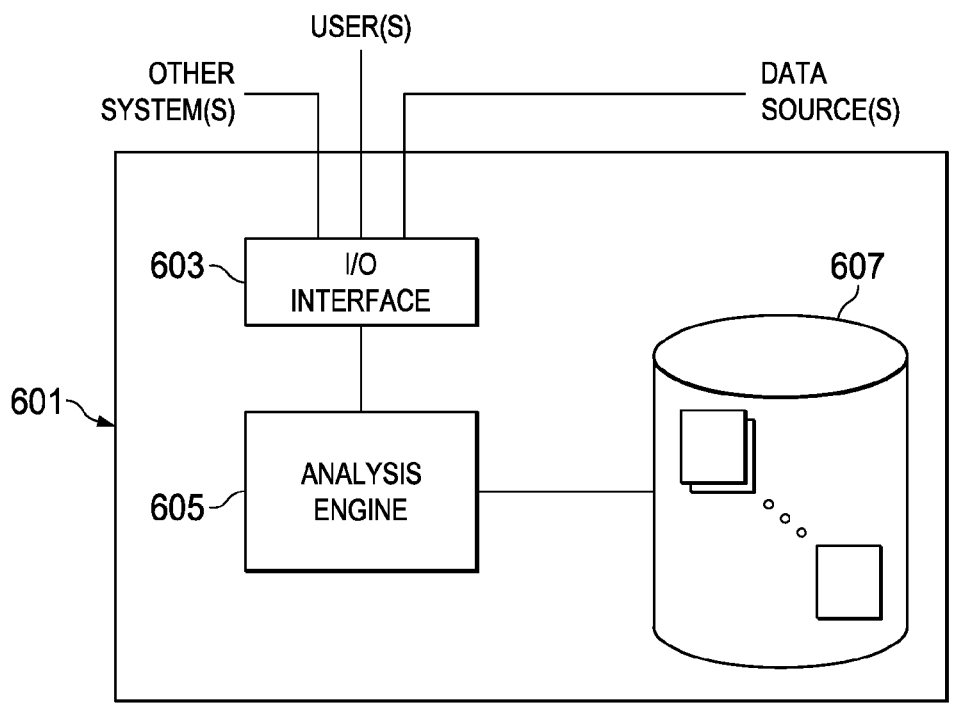
FIG. 6 is a schematic view of a computer system, according to one example embodiment.

Referring now also to FIG. 6, a computer system 601 is schematically illustrated. Computer system 601 can be configured for performing one or more functions with regard to the operation of system and method further disclosed herein. Further, any processing and analysis can be partly or fully performed by computer system 601. Computer system 601 can be partly or fully integrated with other aircraft computer systems.

The system 601 can include an input/output (I/O) interface 603, an analysis engine 605, and a database 607. Alternative embodiments can combine or distribute the input/output (I/O) interface 603, analysis engine 605, and database 607, as desired. Embodiments of the system 601 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the system 601. The I/O interface 603 can be configured for allowing one or more users to input information to the system 601 via any known input device. Examples can include a keyboard, mouse, touch screen, and/or any other desired input device. The I/O interface 603 can be configured for allowing one or more users to receive information output from the system 601 via any known output device. Examples can include a display monitor, a printer, cockpit display, and/or any other desired output device. The I/O interface 603 can be configured for allowing other systems to communicate with the system 601. For example, the I/O interface 603 can allow one or more remote computer(s) to access information, input information, and/or remotely instruct the system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the system 601 to perform one or more of the tasks described herein.

The database 607 provides persistent data storage for system 601. While the term "database" is primarily used, a memory or other suitable data storage arrangement may provide the functionality of the database 607. In alternative embodiments, the database 607 can be integral to or separate from the system 601 and can operate on one or more computers. The database 607 preferably provides non-volatile data storage for any information suitable to support the operation of the system and methods herein, including various types of data discussed further herein. The analysis engine 605 can include various combinations of one or more processors, memories, and software components.

The particular embodiments disclosed herein are illustrative only, as the system and method may be modified and practiced in different but equivalent manners apparent to those skilled in the art having the benefit of the teachings herein. Modifications, additions, or omissions may be made to the system described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the disclosure.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

The invention claimed is:

1. A system for limiting vertical axis augmentation in a rotorcraft, the system comprising:
   a sensor configured to measure a torque during flight of the rotorcraft; and a computer having a control law, the control law operable to generate a command to an actuator based upon a difference between a commanded vertical state and an actual vertical state;
   wherein the computer is configured for comparing the torque measured by the sensor to a predetermined lower torque limit, such that when the torque is below the predetermined lower torque limit, the computer is configured to adjust the command to prevent a decrease in torque below the lower torque limit, during flight of the rotorcraft;

wherein the computer is configured to adjust the command by reducing an authority of the command by a percentage of a total command authority, the authority of the command being decreased in response to a decrease in the difference between the measured torque and the lower torque limit;

wherein the reducing the authority of the command causes a change in the difference between the commanded vertical state and the actual vertical state; and when the measured torque were below a lower torque limit, the preventing a rotor overspeed of the rotorcraft is a higher priority than maintaining the commanded vertical state.

2. The system according to claim 1, wherein the computer is a flight control computer in the rotorcraft.

3. The system according to claim 1, wherein the actuator is a collective actuator.

4. The system according to claim 1, wherein the actuator is a pitch control actuator.

5. The system according to claim 1, wherein the torque is an engine torque.

6. The system according to claim 1, wherein the commanded vertical state is a commanded altitude and wherein the actual vertical state is an actual altitude.

7. The system according to claim 1, wherein the computer is configured to adjust the command by reducing the authority of the command to zero.

8. The system according to claim 1, wherein the computer is configured to adjust the command by reducing collective pitch of a plurality of rotor blades.

9. A method of limiting vertical axis augmentation in a rotorcraft, the method comprising:
measuring a torque with a sensor;
deriving a comparison of the measured torque to a lower torque limit, using a computer processor; and
adjusting a vertical axis control command based upon the comparison of the measured torque to the lower torque limit, to prevent a decrease in torque below the lower torque limit, during flight of the rotorcraft;

wherein the computer is configured to adjust the command by reducing an authority of the command by a percentage of a total command authority, the authority of the command being decreased in response to a decrease in the difference between the measured torque and the lower torque limit;

wherein the reducing the authority of the command causes a change in a difference between a commanded vertical state and an actual vertical state; and when the measured torque were below a lower torque limit, then preventing a rotor overspeed of the rotorcraft is a higher priority than maintaining the commanded vertical state.

10. The method according to claim 9, wherein the percentage is based upon the comparison of the torque to the lower torque limit.

11. The method according to claim 9, wherein the adjusting the vertical axis control command includes completely reducing an authority of the vertical axis control command.

12. The method according to claim 9, wherein the torque is an engine torque.

13. The method according to claim 9, further comprising:
communicating the vertical axis control command to an actuator.

14. The method according to claim 13, wherein the actuator is a collective actuator.

15. The method according to claim 13, wherein the actuator is a pitch control actuator.

16. The method according to claim 9, further comprising:
shaping the vertical axis control command with a controller prior to the vertical axis control command being received by an actuator.

* * * * *